United States Patent
Boldyrev et al.

(10) Patent No.: US 9,324,033 B2
(45) Date of Patent: Apr. 26, 2016

(54) METHOD AND APPARATUS FOR PROVIDING STANDARD DATA PROCESSING MODEL THROUGH MACHINE LEARNING

(75) Inventors: Sergey Boldyrev, Söderkulla (FI); Pavandeep Kalra, Shrewsbury, MA (US)

(73) Assignee: Nokia Technologies Oy, Espoo (FI)

( * ) Notice: Subject to any disclaimer, the term of this patent is extended or adjusted under 35 U.S.C. 154(b) by 526 days.

(21) Appl. No.: 13/614,447

(22) Filed: Sep. 13, 2012

(65) Prior Publication Data
US 2014/0074760 A1 Mar. 13, 2014

(51) Int. Cl.
*G06N 99/00* (2010.01)
*G06F 17/30* (2006.01)

(52) U.S. Cl.
CPC ........ *G06N 99/005* (2013.01); *G06F 17/30563* (2013.01)

(58) Field of Classification Search
None
See application file for complete search history.

(56) References Cited

U.S. PATENT DOCUMENTS

| | | | |
|---|---|---|---|
| 7,568,019 B1* | 7/2009 | Bhargava et al. | 709/223 |
| 2004/0215656 A1* | 10/2004 | Dill et al. | 707/103 R |
| 2005/0055369 A1* | 3/2005 | Gorelik et al. | 707/102 |
| 2006/0106590 A1* | 5/2006 | Tseng et al. | 703/20 |
| 2008/0134138 A1* | 6/2008 | Chamieh et al. | 717/105 |
| 2009/0182856 A1* | 7/2009 | Gotta | H04L 41/046 709/223 |
| 2010/0114629 A1* | 5/2010 | Adler et al. | 705/7 |
| 2010/0174754 A1 | 7/2010 | B'Far et al. | |
| 2014/0075357 A1* | 3/2014 | Flores et al. | 715/771 |

FOREIGN PATENT DOCUMENTS

| WO | WO 2011/154594 A1 | 12/2011 |
|---|---|---|
| WO | WO 2011/157889 A1 | 12/2011 |
| WO | WO 2012/007636 A1 | 1/2012 |

OTHER PUBLICATIONS

Acharya et al, Mining API Patterns as Partial Orders from Source Code: From Usage Scenarios to Specifications, 2011.*
Michail, Data Mining Library Reuse Patterns using Generalized Association Rules, 2000.*
Shaikh et al, Intelligent Decision Making Based on Data Mining using Differential Evolution Algorithms and Framework for ETL Workflow Management, 2010.*
Tonella et al, Inference of object-oriented design patterns, 2001.*
Boldyrev, "Dynamic Execution Context Management in Heterogeneous Computing Environments, Towards Persistent Computing Environments", web page, Nov. 9, 2011, pp. 1-45, http://dcslab.hanyang.ac.kr/nvramos11fall/presentation/Boldyrev.pdf.

* cited by examiner

*Primary Examiner* — Jeffrey A Gaffin
*Assistant Examiner* — Mikayla Chubb
(74) *Attorney, Agent, or Firm* — Ditthavong & Steiner, P.C.

(57) ABSTRACT

An approach for providing a standard data processing model through machine learning is described. A machine learning data processing platform may process and/or facilitate a processing of the at least one data set associated with one or more computation closures to determine at least one data pattern. The machine learning data processing platform may also determine one or more data processing models associated with the one or more computation closures, the at least one data set, or a combination thereof. The machine learning data processing platform may further cause, at least in part, a training of the one or more data processing models to reflect the at least one data pattern.

18 Claims, 13 Drawing Sheets

100

300

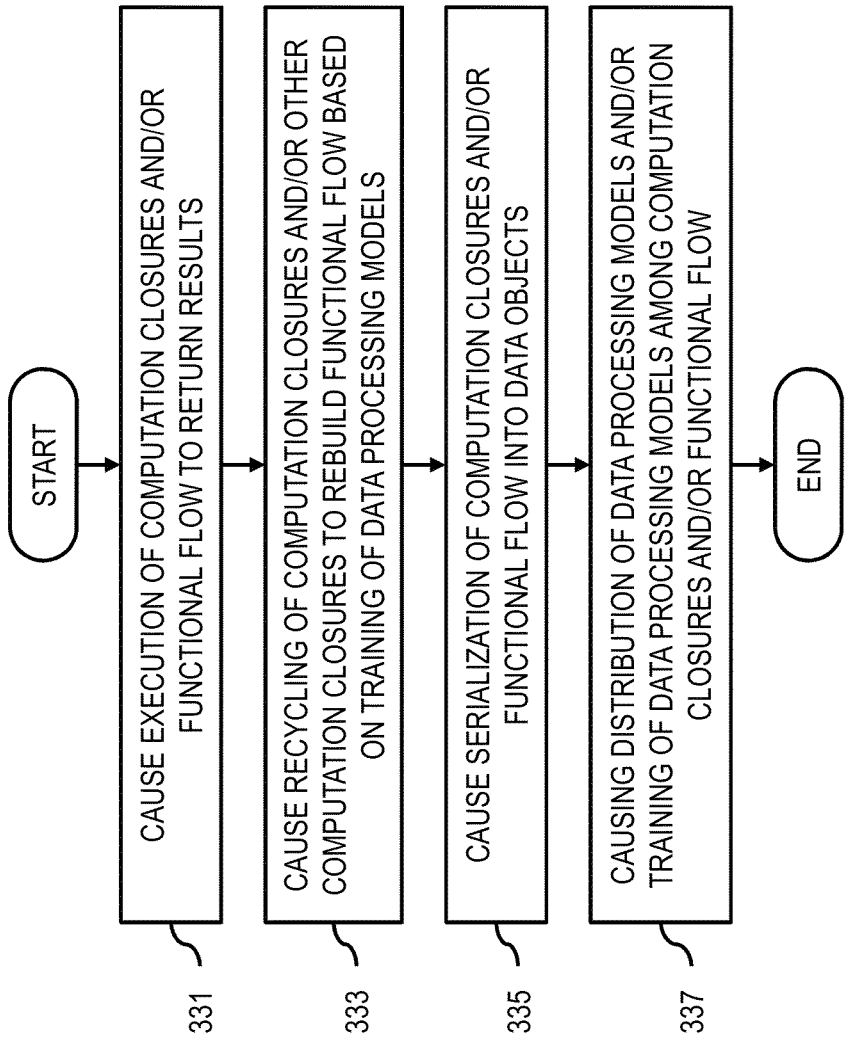

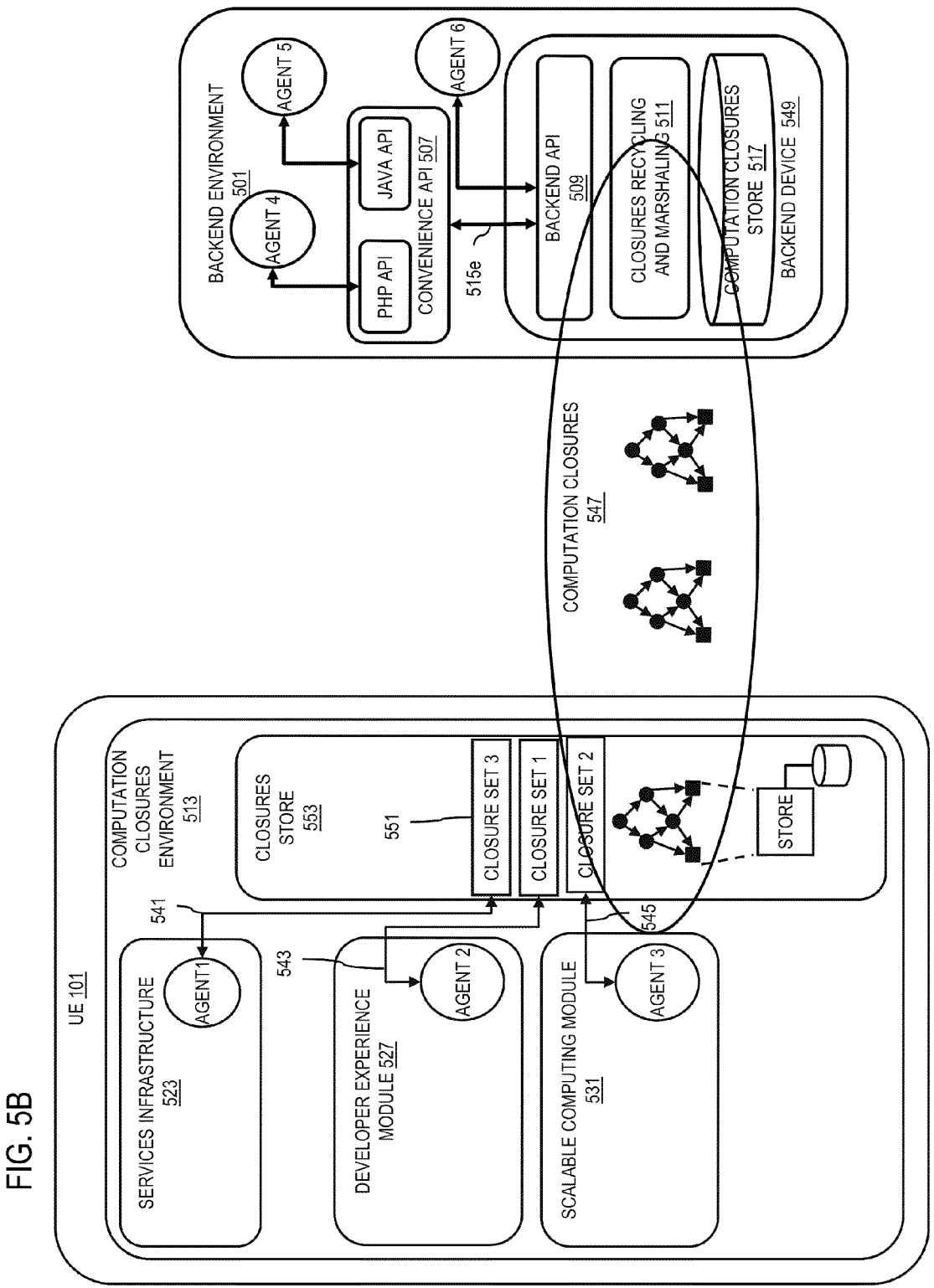

METHOD AND APPARATUS FOR PROVIDING STANDARD DATA PROCESSING MODEL THROUGH MACHINE LEARNING

BACKGROUND

Service providers and device manufacturers (e.g., wireless, cellular, etc.) are continually challenged to deliver value and convenience to consumers by, for example, providing compelling network services. These services are leading to vast amounts of data (structured and binary) which need to be managed, stored, searched, analyzed, etc. Over the last decade, the internet services have accumulated data in the range of exabytes ($10^{16}$ bytes). Although most of this data is not structured in nature, however, it must be stored, searched and analyzed appropriately before any real time information can be drawn from it for providing services to the users.

In order to perform analytics on data and gain insight into the data, the data has to be put into the analytics engine through various ingestion schemes. The data is typically received in an unstructured format at the time it is ingested. Then, it needs to be cleansed, structured, and validated into a format conductive for analysis. In order to cleanse the data and make it available for analytics, the data is required to go through a pipeline of disparate systems. Almost everyone in the industry spends a fair amount of time providing custom work to create a pipeline through disparate systems for each data source that is brought in. Getting the data ready for analysis is very time consuming and labor intensive work. Typically, developers write various custom map-reduce programs to cleanse the data. However, if the data could be reflected in terms of some standard data models and cleansing processes, then it would be possible to create a standard pipeline and greatly streamline the ETL (Extraction-Transformation-Load) process which is mostly the biggest obstacle and time consuming area of analytics. Standard data models are very hard to figure out because schematics of the data changes continuously because data and usage of that data changes continuously in the device.

Some Example Embodiments

Therefore, there is a need for an approach for providing a standard data processing model through machine learning.

According to one embodiment, a method comprises processing and/or facilitating a processing of the at least one data set associated with one or more computation closures to determine at least one data pattern. The method also comprises determining one or more data processing models associated with the one or more computation closures, the at least one data set, or a combination thereof. The method further comprises causing, at least in part, a training of the one or more data processing models to reflect the at least one data pattern.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of the at least one data set associated with one or more computation closures to determine at least one data pattern. The apparatus is also caused to determine one or more data processing models associated with the one or more computation closures, the at least one data set, or a combination thereof. The apparatus is further caused to cause, at least in part, a training of the one or more data processing models to reflect the at least one data pattern.

According to another embodiment, a computer-readable storage medium carries one or more sequences of one or more instructions which, when executed by one or more processors, cause, at least in part, an apparatus to process and/or facilitate a processing of the at least one data set associated with one or more computation closures to determine at least one data pattern. The apparatus is also caused to determine one or more data processing models associated with the one or more computation closures, the at least one data set, or a combination thereof. The apparatus is further caused to cause, at least in part, a training of the one or more data processing models to reflect the at least one data pattern.

According to another embodiment, an apparatus comprises means for processing and/or facilitating a processing of the at least one data set associated with one or more computation closures to determine at least one data pattern. The apparatus also comprises means for determining one or more data processing models associated with the one or more computation closures, the at least one data set, or a combination thereof. The apparatus further comprises means for causing, at least in part, a training of the one or more data processing models to reflect the at least one data pattern.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A-3B are flowcharts of processes for providing a standard data processing model through machine learning, according to one embodiment;

FIGS. 5A-5C are diagrams of computation distribution among devices, according to various embodiments;

DESCRIPTION OF SOME EMBODIMENTS

Figure 1:
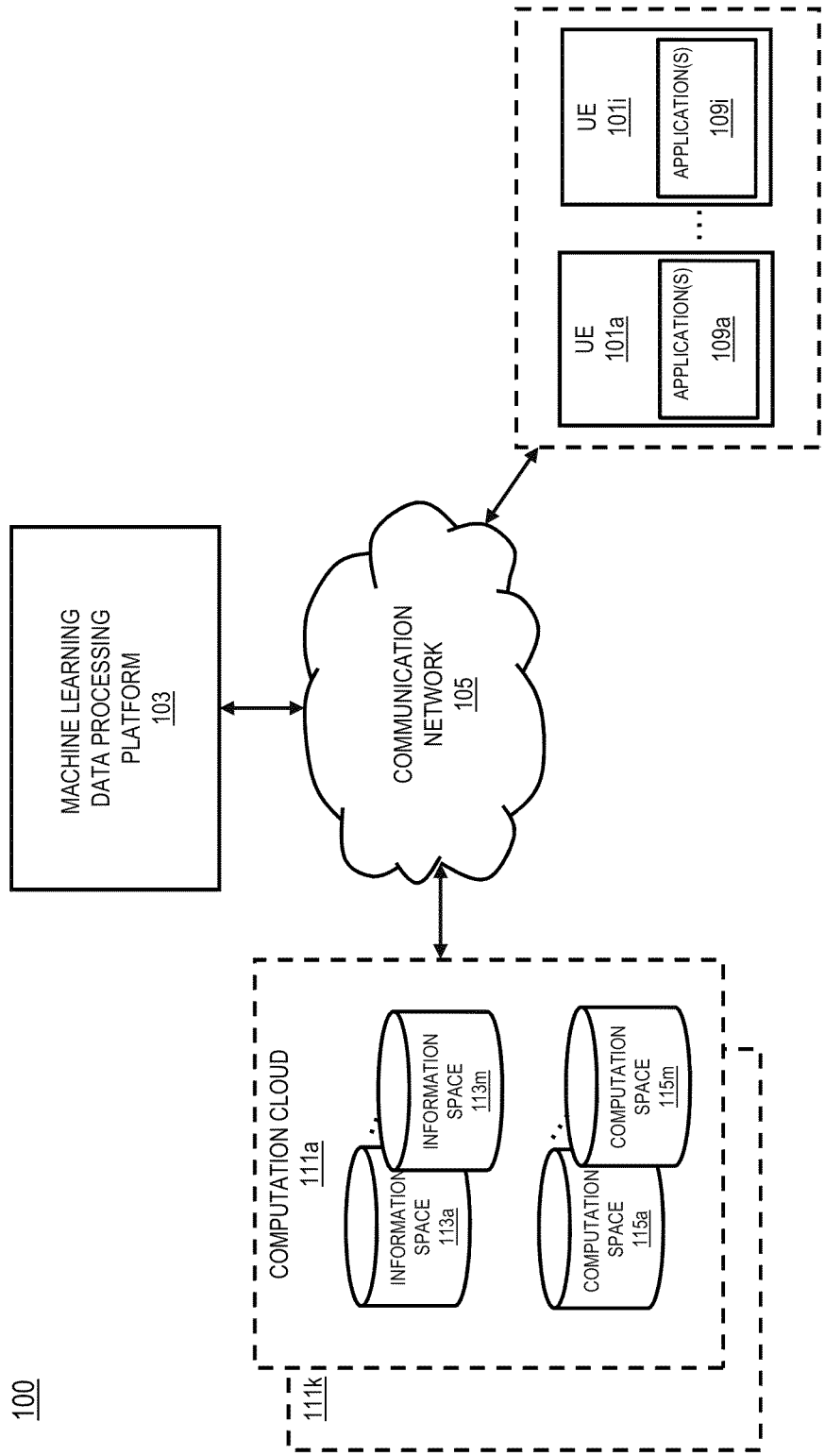
FIG. 1 is a diagram of a system capable of providing a standard data processing model through machine learning, according to one embodiment.

Examples of a method, apparatus, and computer program for providing a standard data processing model through machine learning are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term Extract-Transform-Load (ETL) refers to a process that is used to take information from one or more sources, normalize it in some way to some convenient schema, and then insert it into some other repository. A common use of ETL process is for data warehousing, where regular updates from one or more systems are merged and refined so that analysis can be done using more specialized tools. Typically the same process is run over and over, as new data appears in the source application(s). Furthermore, the term ETL pipeline refers to a set of data processing elements associated with the ETL process and connected in series, so that the output of one element is the input of the next element. Although various embodiments are described with respect to ETL, it is contemplated that the approach described herein may be used with other processes, methods, and tools for data integration and data cleansing.

As used herein, the term "cloud" refers to an aggregated set of information and computational closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in Rule ML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

As used herein, the term "computation closure" identifies a particular computation procedure together with relations and communications among various processes including passing arguments, sharing process results, selecting results provided from computation of alternative inputs, flow of data and process results, etc. The computation closures (e.g., a granular reflective set of instructions, data, and/or related execution context or state) provide the capability of slicing of computations for processes and transmitting the computation slices between devices, infrastructures and clouds.

As used herein, the term "ontology" refers to a set of representational primitives with which to model a domain of knowledge. The representational primitives are typically classes (or sets), attributes (or properties), and relationships (or relations among class members). The representational primitives include information about meaning and constrains on logically consistent application. Ontology is a defined schema for specifying the various contextual and semantic controls, structures, rules and mechanisms for supporting distributed computing and/or deployed software agent processing within the information space. A common ontology among devices is necessary for supporting data exchange and application processing to occur within a shared or distributed computing environment accessible to multiple different users.

As used herein, the term "data pattern" refers to a type of software data patterns including structural pattern, a behavioral pattern, a concurrency pattern, a creational pattern, etc. The structural pattern may include an adapter pattern, aggregate pattern, bridge pattern, composite pattern, decorator pattern, extensibility pattern, facade pattern flyweight pattern, pipes and filters, private class data pattern, proxy pattern, etc. The behavioral pattern may include a chain of responsibility pattern, command pattern, hierarchical visitor pattern, interpreter pattern, iterator pattern, mediator pattern, memento pattern, null object pattern, observer pattern, etc. The concurrency pattern may include an active object, balking pattern, double checked, locking pattern, guarded suspension, leaders/followers pattern, monitor object, reactor pattern, read write lock pattern, scheduler pattern, thread pool pattern, thread specific storage, etc. The creation pattern may include an abstract factory pattern, builder pattern, factory method pattern, prototype pattern, singleton pattern, etc.

FIG. 1 is a diagram of a system capable of providing data processing model through machine learning, according to one embodiment. The network services are leading to vast amounts of data (structured and binary) which need to be managed, stored, searched, analyzed, etc. Over the last decade, the internet services have accumulated data in the range of exabytes ($10^{16}$ bytes). Although most of this data is not structured in nature, however, it must be stored, searched and analyzed appropriately before any real time information can be drawn from it for providing services to the users.

In order to perform analytics on data and gain insight into the data, the data has to be put into the analytics engine through various ingestion schemes. The data is typically received in an unstructured format at the time it is ingested. Then, it needs to be cleansed, structured, and validated into a format conductive for analysis. In order to cleanse the data and make it available for analytics, the data is required to go through a pipeline of disparate systems. Almost everyone in the industry spends a fair amount of time providing custom work to create a pipeline through disparate systems for each data source that is brought in. Getting the data ready for analysis is very time consuming and labor intensive work. Typically, developers write various custom map-reduce programs to cleanse the data. However, if the data could be reflected in terms of some standard data models and cleansing processes, then it would be possible to create a standard pipeline and greatly streamline the ETL (Extract-Transform-Load) process which is mostly the biggest obstacle and time consuming area of analytics. Standard data models are very hard to figure out because schematics of the data changes continuously because data and usage of that data changes continuously in the device.

To address this problem, a system 100 of FIG. 1 introduces the capability to provide a standard data processing model through machine learning. The standard data model can be made through machine learning by sharing the data between the applications and can be used for the standard analytics pipeline. Machine learning can be related to making computers to modify or adapt their actions so that these actions get more accurate where accuracy is measured by how well the chosen actions reflect the correct ones. A model which can predicts the data model schematic more accurately can be created based on the data shared between the applications on the device. In turn, this standard data model can be used for creating a more accurate ETL (Extraction-Transformation-Load) pipeline.

As shown in FIG. 1, the system 100 can comprise user equipment (UEs) 101a-101i (collectively, UE 101) having connectivity to the machine learning data processing platform 103, via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

As shown in FIG. 1, the system 100 can comprise a machine learning data processing platform 103 which can use various data processing models to create a standardized data processing model. The machine learning data processing platform 103 can also reflect on the data processing models to create a standard set of processes and use a combination of the data processing models, standardized data processing model, and the standard processes to define a standard pipeline over disparate systems that communicate with each other via the communication network 105. The standard analytics pipeline can be defined, giving the ability to Extract, Transform and Load back information to the stream (presented as a number of finite or transitive closures) in secure and efficient manner.

As shown in FIG. 1, the system 100 can further comprise computation clouds 111a-111k (collectively, computation cloud 111) which includes information stores 113a-113m and computation stores 115a-115m. Each of the one or more computation spaces 115a-115m includes multiple sets of computational closures and/or functional blocks (e.g., program codes, scripts, software, etc.). The UE 101 may have access to various pieces of information and computations distributed over the computation cloud 111. By way of example, the UE 101 may connect to the computation cloud 111 not only for accessing the services provided for end users but also for activities such as developing, distributing, processing, and aggregating various computations.

In one embodiment, the computation closures stored in the computation cloud 111 may be accessed and reused by the applications 109a-109i (collectively, applications 109) without the need for repeating the Extraction-Transformation-Load (ETL) process. The computation closures can be encapsulated as data and be passed to API, stored, shared or spread the computation. When the computation closures return results, the results can be seen as parts of a functional flow. The data encapsulating the computation closures can be refined according to certain semantics defined with computational ontology. In that way, computation recycling as well as building up of the results or partial results are feasible—the base mechanism for machine learning of data processing models.

By way of example, the UE 101, the machine learning data processing platform 103, and the computation cloud 111, communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
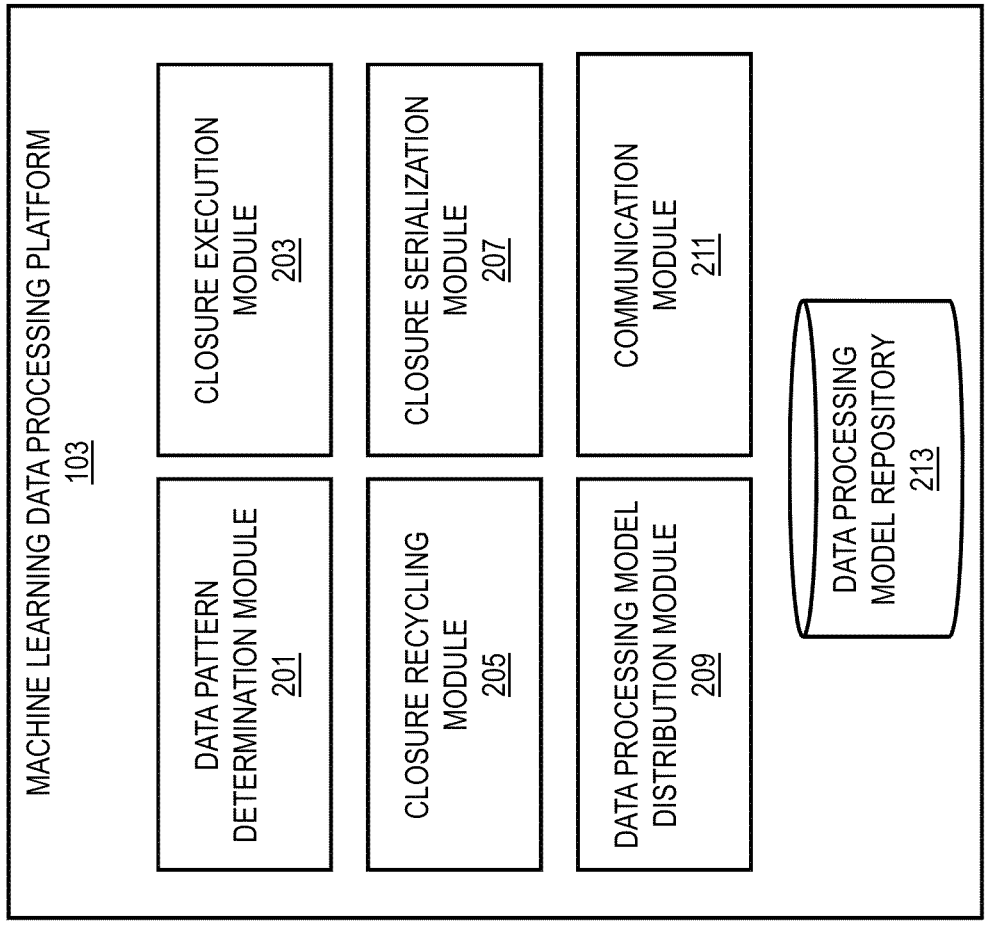
FIG. 2 is a diagram of the components of a machine learning data processing platform, according to one embodiment.

FIG. 2 is a diagram of the components of a machine learning data processing platform 103, according to one embodiment. By way of example, the machine learning data processing platform 103 includes one or more components for providing a standard data processing model through machine learning. It is contemplated that the functions of these components may be combined in one or more components or performed by other components of equivalent functionality. In this embodiment, the machine learning data processing platform 103 includes a data pattern determination module 201, a closure execution module 203, a closure recycling module 205, a closure serialization module 207, a data processing model distribution module 209, a communication module 211, and a data processing model repository 213.

In one embodiment, the data pattern determination module 201 may determine data patterns by processing a data set associated with computation closures. By way of example, a data set associated with social network news feed may be processed to determine data pattern of the data set. In one embodiment, the machine learning data processing platform 103 may process the data set to determine classifiers; and the data pattern may be determined based on the classifiers. The classifier may be algorithms that implement classification or a mathematical function implemented by a classification algorithm that map input data to a category. In terms of machine learning, classification is an instance of supervised learning (i.e., learning where a training set of correctly-identified observations is available). In one embodiment, the data pattern determination module 201 may process the data set based on semantic rules to determine the data pattern. The semantic rules are specific to the processing of linguistic meaning of computer programs. In this framework, algorithms and architectures of the computer programs are analyzed in terms of decidability, time/space complexity, data structures required, communication protocols, etc.

In one embodiment, the closure execution module 203 may execute the computation closures and/or functional flows to return results. As defined above, each computation closure contains a particular executable computation procedure. The closure execution module 203 may trigger the execution of the computation procedures within the computation closure. A plurality of the computation closure can be chained into a functional flow and the computation procedure in each computation closure can be executed in series. A result returned from a computation closure can become an input for next computation closure as a part of the functional flow. When the computation closure returns the result, the result can be refined to suit for the next computation closure. The computation closures, functional flow, and/or results (or partial results) can be stored in a data processing model repository 213 for processing in future. In that way, recycling of computation closures is feasible.

In one embodiment, the closure recycling module 205 may recycle the computation closures and/or other computation closures to rebuild a functional flow based on training of data processing models. The computation closures stored in the data processing model repository 213 and other computation closures not stored in the data processing model can be combined to form a functional flow. The computation closures are selected based on the trained information of the data processing model. For example, a data processing model M is trained to process a computation A (that is stored in a repository) and a computation B (that is currently presented) for type X data set. Here, result of computation A is required for processing computation B. When type X data set is processed, the computation A and the computation B are distributed to a functional flow based on the data processing model M. Then, the computation A is reused for next computation C. In that way, recycling of the computation A is performed.

In one embodiment, the serialization module 207 may utilize the computation closures and produces the serialized granular computation elements. The computation closures may be serialized in a format, syntax or metadata structure suitable for being appended to, attached to or associated with the data. The serialization module 207 may ensure that the format corresponds to the particular UE 101 that is to receive the computation. Pursuant to the serialization process, the processing state of each computation closure may be also encoded and stored in the computation space accordingly.

In one embodiment, the data processing model distribution module 209 may distribute the data processing models and/or training of data processing models among computation closures and/or functional flow. Various types of data processing models and/or training of data processing model may be applied to each computation closures and/or functional flow in a series. By way of example, a functional flow composed of a computation associated with social network data and a computation associated with contract data may be performed based on different type of data processing models for each computation. The data processing model and/or training of data processing models may be distributed accordingly based on data pattern or type.

In one embodiment, the communication module 211 may form a session over a network 105 between the UE 101, the machine learning data processing platform 103, and the computation cloud 111. By way of example, the communication module 211 executes various protocols and data sharing techniques for enabling collaborative execution between the UE 101 and the machine learning data processing platform 103 over the communication network 105 (e.g., cloud based infrastructure). It is noted that the communication module 211 is also configured to support application calls or application programming interface requests by the UE 101 (e.g., retrieval of data items as referenced by an application operable by the UE 101).

In one embodiment, the data processing model repository 213 may be a data structure containing the computation closures, the functional flows, the results (or partial results) and/or data processing models. The data processing models may reflect processing of a data set to summarize, analyze, record, sort, calculate, disseminate, store or otherwise convert the data set in useable information. The data processing models may be trained to reflect data patterns of the data set. As a data set is processed, a data processing models may be trained to compute one or more computations associated with the data set based on a data pattern of the data set.

Figure 3A:
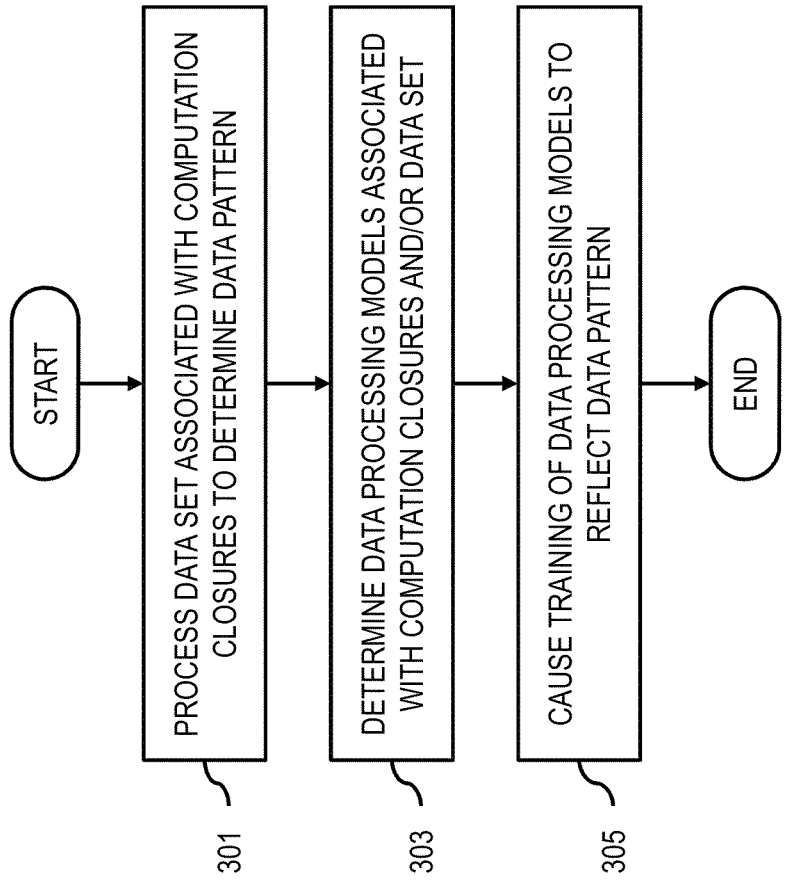
Figure 8:
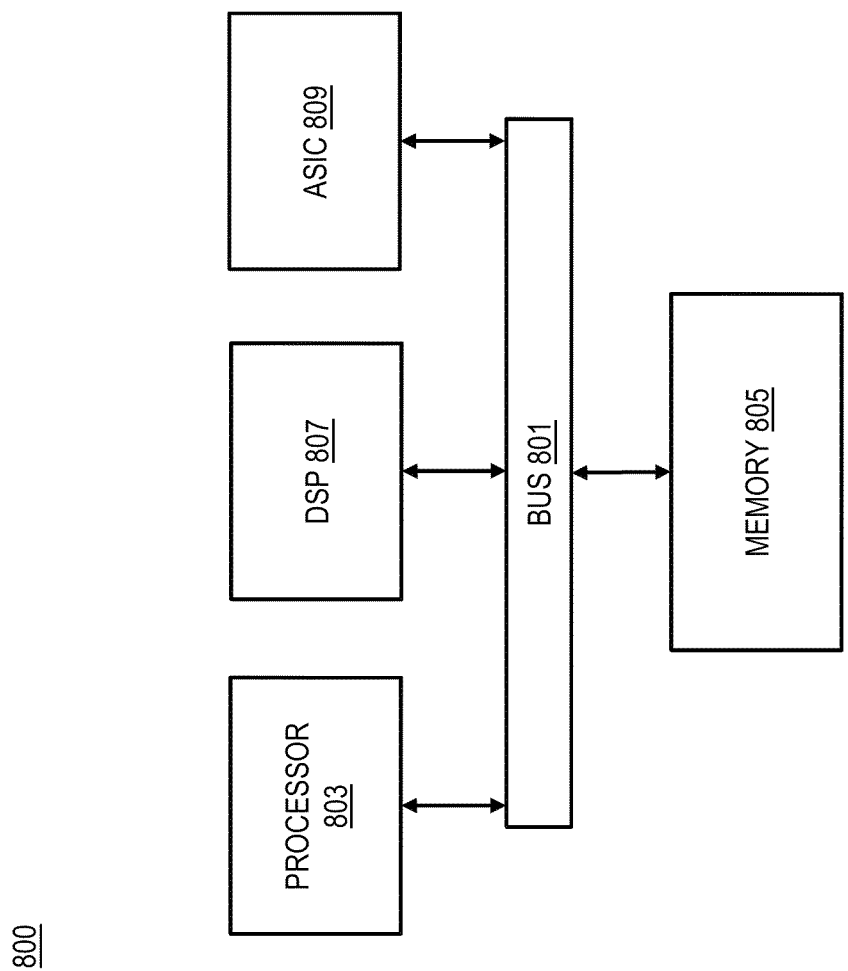
FIG. 8 is a diagram of a chip set that can be used to implement an embodiment of the invention.

FIGS. 3A-3B are flowcharts of processes for providing a standard data processing model through machine learning, according to one embodiment. FIG. 3A is a flowchart of a process for training data process models to reflect a data pattern, according to one embodiment. In one embodiment, the machine learning data processing platform 103 performs the process 300 and is implemented in, for instance, a chip set including a processor and a memory as shown in FIG. 8. In step 301, the machine learning data processing platform 103 may process a data set associated with computation closures to determine a data pattern. By way of example, a data set associated with social network news feed may be processed to determine data pattern of the data set. In one embodiment, the machine learning data processing platform 103 may process the data set to determine classifiers; and the data pattern may be determined based on the classifiers. The classifiers may be algorithms that implement classification or a mathematical function implemented by a classification algorithm that map input data to a category. In terms of machine learning, classification is an instance of supervised learning (i.e., learning where a training set of correctly-identified observations is available). In one embodiment, the machine learning data processing platform 103 may process the data set based on semantic rules to determine the data pattern. The semantic rules are specific to the processing of linguistic meaning of computer programs. In this framework, algorithms and architectures of the computer programs are analyzed in terms of decidability, time/space complexity, data structures required, communication protocols, etc.

In one embodiment, the computation closures may comprise a functional flow. For example, a computation closure A may include a functional flow X, wherein the functional flow X is composed of a computation B and a computation C. In one embodiment, the computation closures and/or the data set may be associated with a domain; and the data processing models and/or training of the data processing models may be specific to a domain. The domain may be specific to an application or a vendor associated with sets of data to be processed. For instance of an application specific domain, based on data pattern (e.g., news feed pattern) of a mobile application (e.g. social network application), the data processing model may be trained to process the data sets through computations associate with the application.

In step 303, the machine learning data processing platform 103 may determine data processing models associated with the computation closures and/or the data set. By way of example, a data processing model for social network news feed data may be associated with the computation closures for extracting, analyzing, or refining news feeds data. In one embodiment, the data processing models may be associated with data extraction processes, data transformation processes, and/or data loading processes (altogether, ETL processes).

In step 305, the data processing models may be trained to reflect the data pattern. As a data set is processed, the data processing models may be trained to compute one or more computations associated with the data set based on a data pattern of the data set. By way of example, a data processing model for social network news feed may be trained to facilitate processing of particular data type (e.g., picture, audio, video, text, etc.), or using certain type of filters or pipeline for the particular data type.

FIG. 3B is a flowchart of a process for serializing data processing models, according to one embodiment. In one embodiment, the machine learning data processing platform 103 performs the process 330 and is implemented in, for instance, a chip set including a processor and a memory as shown in FIG. 8. In step 331, the computation closures and/or functional flow may be executed to return results. As defined above, each computation closure contains a particular executable computation procedure. The machine learning data processing platform 103 may trigger the execution of the computation procedures within the computation closure. A plurality of the computation closure can be chained into a functional flow and the computation procedure in each computation closure can be executed in series. A result returned from a computation closure can become an input for next computation closure as a part of the functional flow. When the computation closure returns the result, the result can be refined to suit for the next computation closure. The computation closures, functional flow, and/or results (or partial results) can be stored in a data processing model repository 213 for processing in future. In that way, recycling of computation closures is feasible.

In step 333, the computation closures and/or other computation closures may be recycled to rebuild functional flow based on training of data processing models. The computation closures stored in the data processing model repository 213 and other computation closures not stored in the data processing model can be combined to form a functional flow. The computation closures are selected based on the trained information of the data processing model. For example, a data processing model M is trained to process a computation A (that is stored in a repository) and a computation B (that is currently presented) for type X data set. Here, result of computation A is required for processing computation B. When type X data set is processed, the computation A and the computation B are distributed to a functional flow based on the data processing model M. Then, the computation A is reused for next computation C. In that way, recycling of the computation A is performed.

In step 335, the computation closures and/or functional flow may be serialized into data objects. The computation closures may be serialized in a format, syntax or metadata structure suitable for being appended to, attached to or associated with the data. The machine learning data processing platform 103 may ensure that the format corresponds to the particular UE 101 that is to receive the computation. Pursuant to the serialization process, the processing state of each computation closure may be also encoded and stored in the computation space accordingly.

In step 337, the data processing models and/or training of data processing models are distributed among computation closures and/or functional flow. Various types of data processing models and/or training of data processing model may be applied to each computation closures and/or functional flow. By way of example, a functional flow composed of a computation associated with social network data and a computation associated with calendar data may be executed based on corresponding data processing models for each computation. The data processing model and/or training of data processing models may be distributed based on data pattern or type.

Figure 4:
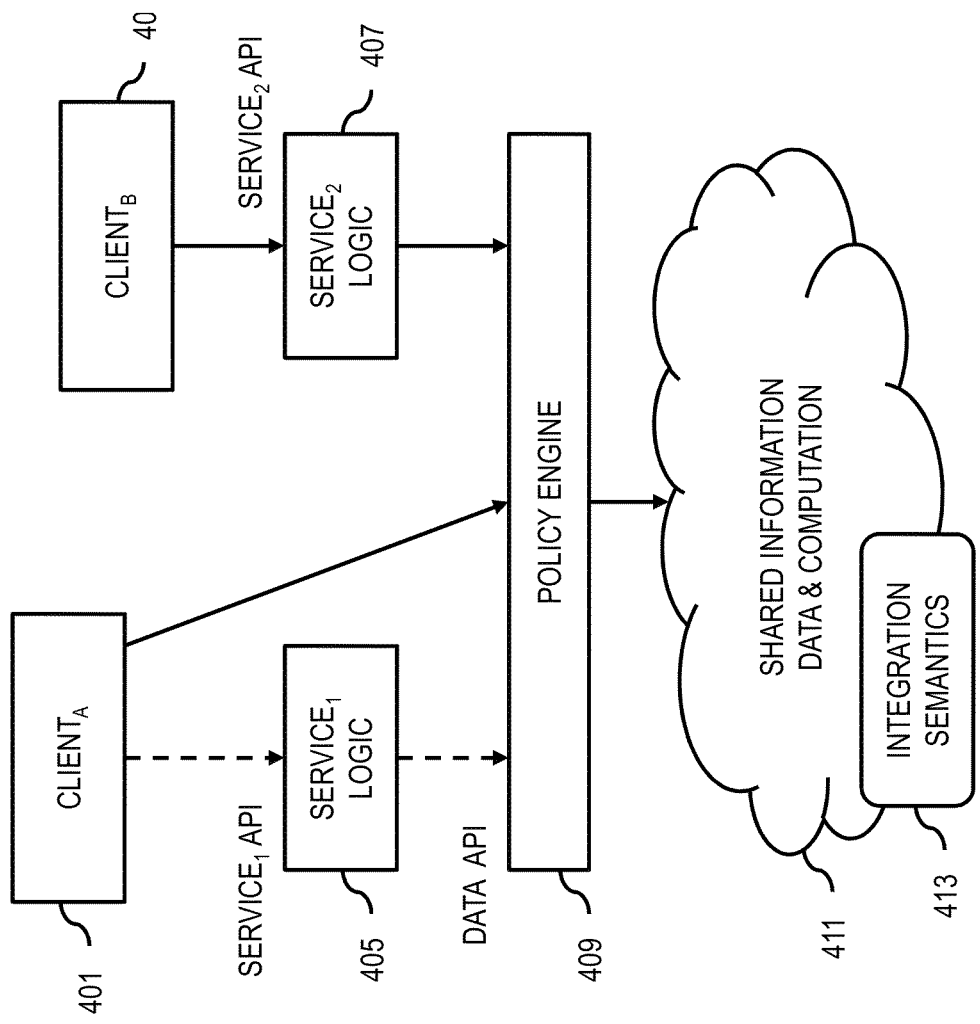
FIG. 4 is a diagram of an exemplary case where semantics of functional chain are encapsulated into data models, according to one embodiment.

FIG. 4 is a diagram of an exemplary case where semantics of functional chain are encapsulated into data models, according to one embodiment. In this exemplary case, when the CLIENT$_B$ 403 is connected to the SERVICE$_2$ through the SERVICE$_2$ API, and information data and computations are resulted by the SERVICE$_2$ logic 407. The information data and computations are encapsulated into data and passed through the policy engine 409 via the data API. In the policy engine 409, the encapsulated data is parsed and compared to the rules in CLIENT$_B$'s policy. The encapsulated data is stored into the cloud 411 containing shared information data and computations. The semantics from the encapsulated data are integrated into data processing models (integration semantics 413). Then, CLIENT$_A$ 401 can achieve desired goals without owning or computing the data through the service$_1$ logic 405. The CLIENT$_A$ 401 can simply go through the policy engine 409 to find the data processing model from the cloud 411 that matches CLIENT$_A$'s policy and the desired goal is achieved based on the data processing model.

Figure 5A:
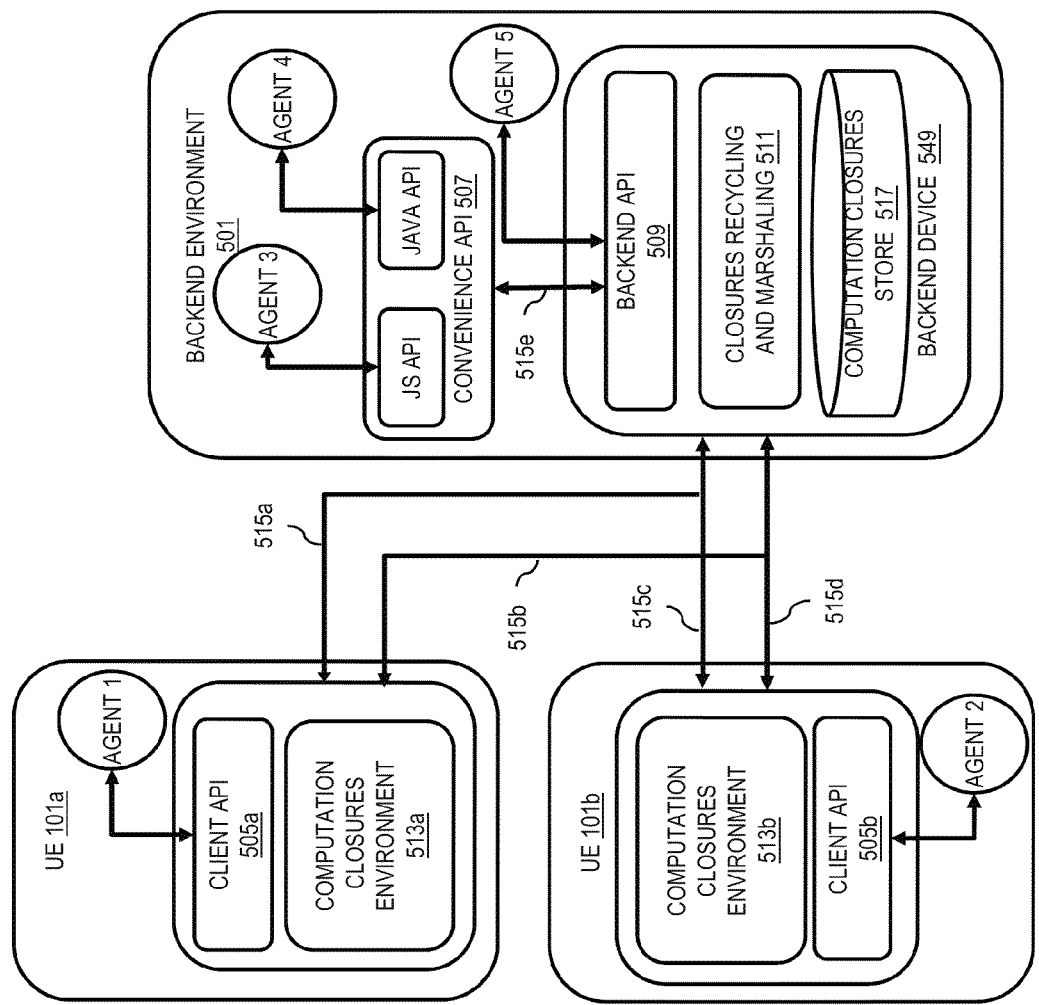
Figure 5C:
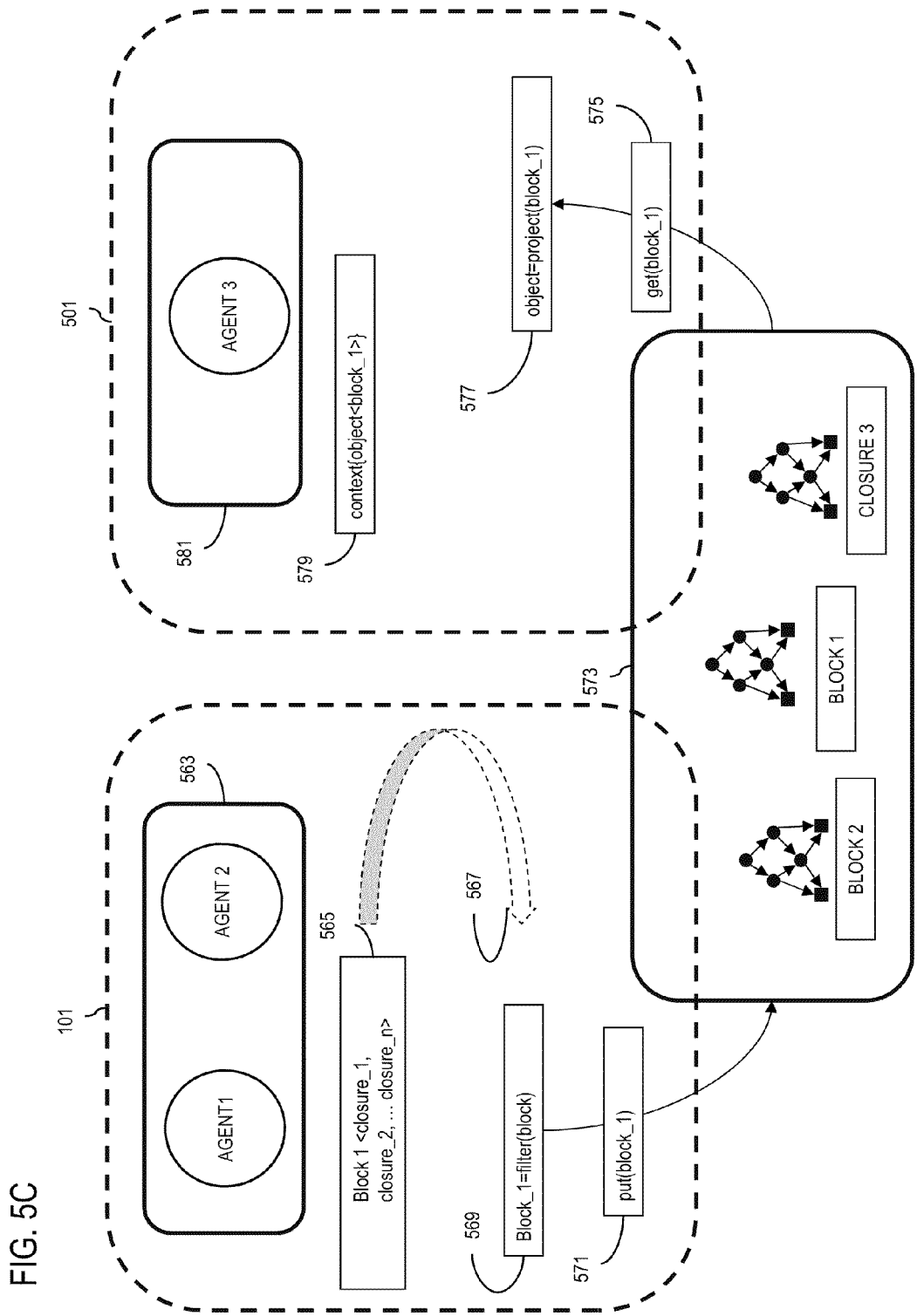
Figure 6A:
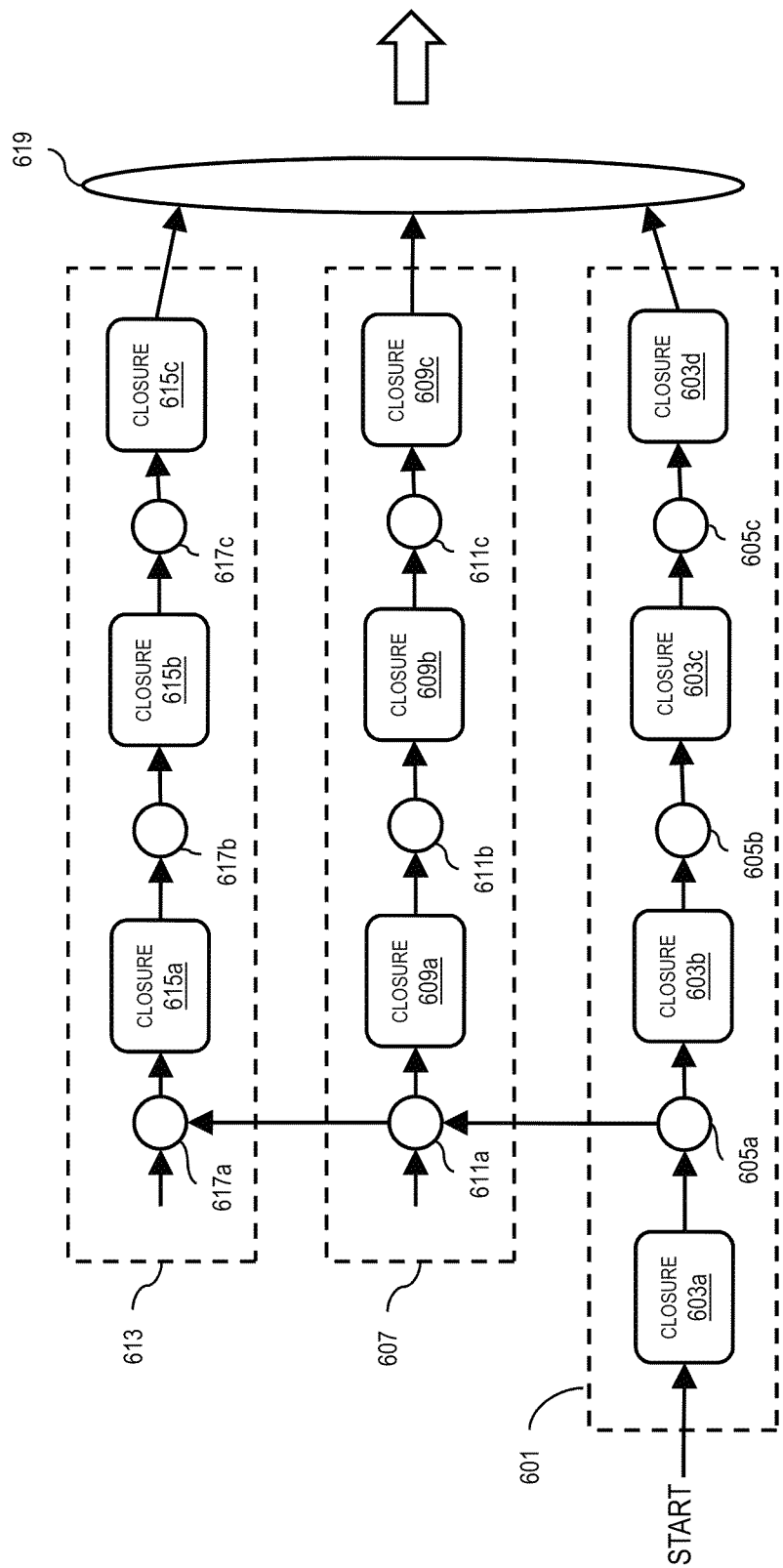
FIGS. 6A and 6B are diagrams describing a functional flow of computation closures as distributed across nodes, according to various embodiments.

FIGS. 5A-5C are diagrams of computation distribution among devices, according to various embodiments. In one embodiment, in FIG. 5A, the backend environment 501 is a network infrastructure. The backend environment may also be a virtual run-time environment within a cloud 111 associated with the owner of UE 101a or on another UE 101b associated with the user. The backend environment 501 may include one or more components (backend devices) 549 and one or more Application Programming Interface (API) such as a convenience API 507 that may include APIs tailored to the software development environments used (e.g. JAVA, PHP, etc.). Furthermore, UEs 101a and 101b may include client APIs 505a and 505b. Each API enables interaction between devices and components within another device or an environment. For example, backend API 509 enables interaction between the backend device 549 and Agent 5, and convenience API 507 enables interaction between the backend device 549 and agents Agent 3 and Agent 4, wherein each agent is a set of processes that handle computation closures within the backend environment 501. APIs 505a and 505b enable interaction between UE 101a and agent Agent1, and UE 101b and agent Agent2 respectively. As seen in the example of FIG. 6A, Agent3 works under PHP while Agent4 is a JAVA process. Each of the UEs 101a and 101b has a computation closure environment 513a and 513b which may be part of a cloud 111. Arrows 515a-515e represent distribution path of computation closures among the environments 513a, 513b and the computation closures store 517. The computation closures store 517 is a repository of computation closures that can be accessed and used by all the UEs and infrastructure components having connectivity to the backend environment 501.

In one embodiment, the backend device 549 may be equipped with a closure recycling and marshaling component 511 that monitors and manages any access to the computation closures store 517. In other embodiments the closure recycling and marshaling (i.e. standardization for uniform use) may be a function of the machine learning data processing platform 103. In one embodiment, the computation closures within environments 513a, 513b and the computation closures store 517 may be composed based on anonymous function objects and automatically created by a compiling system using methods for generating anonymous function objects such as lambda expressions.

FIG. 5B is an expanded view of a computation closure environment 513 as introduced in FIG. 5A. The computation closure environment 513 may be composed of one or more computation closure generating components. In one embodiment the computation closure environment 513 has a services infrastructure 523 that provides various services for the user of the UE 101. The services may include any application that can be performed on the UE 101 such as, games, music, text messaging, voice calls, etc. In one embodiment, the services infrastructure 523 provides support for closure distribution under the supervision of a data backup platform. The agent Agent1 retrieves the computation closures required by the services infrastructure 523 from the closures store 553 and stores the newly generated computation closures by the services infrastructure 523 into the closures store 553 for distribution purposes per arrow 541.

In another embodiment, the computation closure environment 513 has a developer experience module 527 that provides various tools for a developer for manipulating services offered by the UE 101. The tools may include standardized and/or abstract data types and services allowing the developers to chain processes together across development platforms. In one embodiment, the developer experience module 527 provides cross platform support for abstract data types and services under the supervision of a machine learning data processing platform 103 as discussed in FIG. 1. The agent Agent 2 retrieves the computation closures required by the developer experience module 527 from the closures store 553 and stores the newly generated computation closures by the developer experience module 527 into the closures store 553 for distribution purposes per arrow 543.

In yet another embodiment, the computation closure environment 513 has a scalable computing module 531 that provides an abstract wrapper (i.e. monadic wrapper) for the transmitting closures 551. This abstraction provides computation compatibility between the closure sets 551 and the UE 101. The abstract wrapper may provide scheduling, memory management, system calls and other services for various processes associated with the closures 551. These services are provided under the supervision of the machine learning data backup platform 103 as discussed in FIG. 1. The agent Agent 3 retrieves the computation closures required by the scalable computing module 531 from the closures store 553 and stores the newly generated computation closures by the scalable computing module 531 into the closures store 553 for distribution purposes per arrow 545. In one embodiment, the backend environment 501 may access the closures store 553 and exchange/transmit one or more computer closures 547 between the closures store 553 and the backend computation closures store 517.

FIG. 5C is a diagram of computational flow distribution from a device to a backend environment, according to one embodiment. The backend environment 501 may include one or more components, such as backend devices 549 (e.g., router, server, etc.). The UE 101 may include a user context 563 which is being migrated among devices. Agent 1 and Agent 2 are processors that calculate and handle computational closures, functional blocks, or a combination thereof, within the user context 563. The number of agents may be different in different devices based on their design, functionality, processing power, etc. Block 565 represents a functional blocks including a set of computational closures, closure$_{13}$ 1, closure_2, . . . , and closure_n, where each closure is a component of a process, for example, related to a service provided to the user by the user equipment 101. Each closure is a standalone process that can be executed independently from the other closures and expressed in the RDF format. In the example of FIG. 5C, the filtering process 567 extracts block_1 from an information space 565 via filtering the set (shown in block 569). The extracted block_1 is added to an information store 573 using the exemplary Put command 571.

It is assumed, in this example, that a component of the backend environment is selected by the machine learning data processing platform 103 as a destination for computational distribution from the UE 101. The extracted functional block, block_1 is migrated to the component by the machine learning data processing platform 103, and executed on the component. In one embodiment, the component receives the functional block block_1 and extracts it from the information store 573 using the Get command 575. The extracted block_1 is projected into a computational environment with the user device context and the object 577 is produced. The block 579 represents the reconstruction of the block into the initial context by a component in charge of the execution. The aggregated context may then be executed in the run-time environment 581 of the component by Agent 3. In another embodiment, the UE 101 and the component may exchange places and the distribution is performed from the component to the UE 101. In another embodiment, the component may be a UE. In this embodiment the decomposition and aggregation processes are similar to the above example.

Figure 6B:
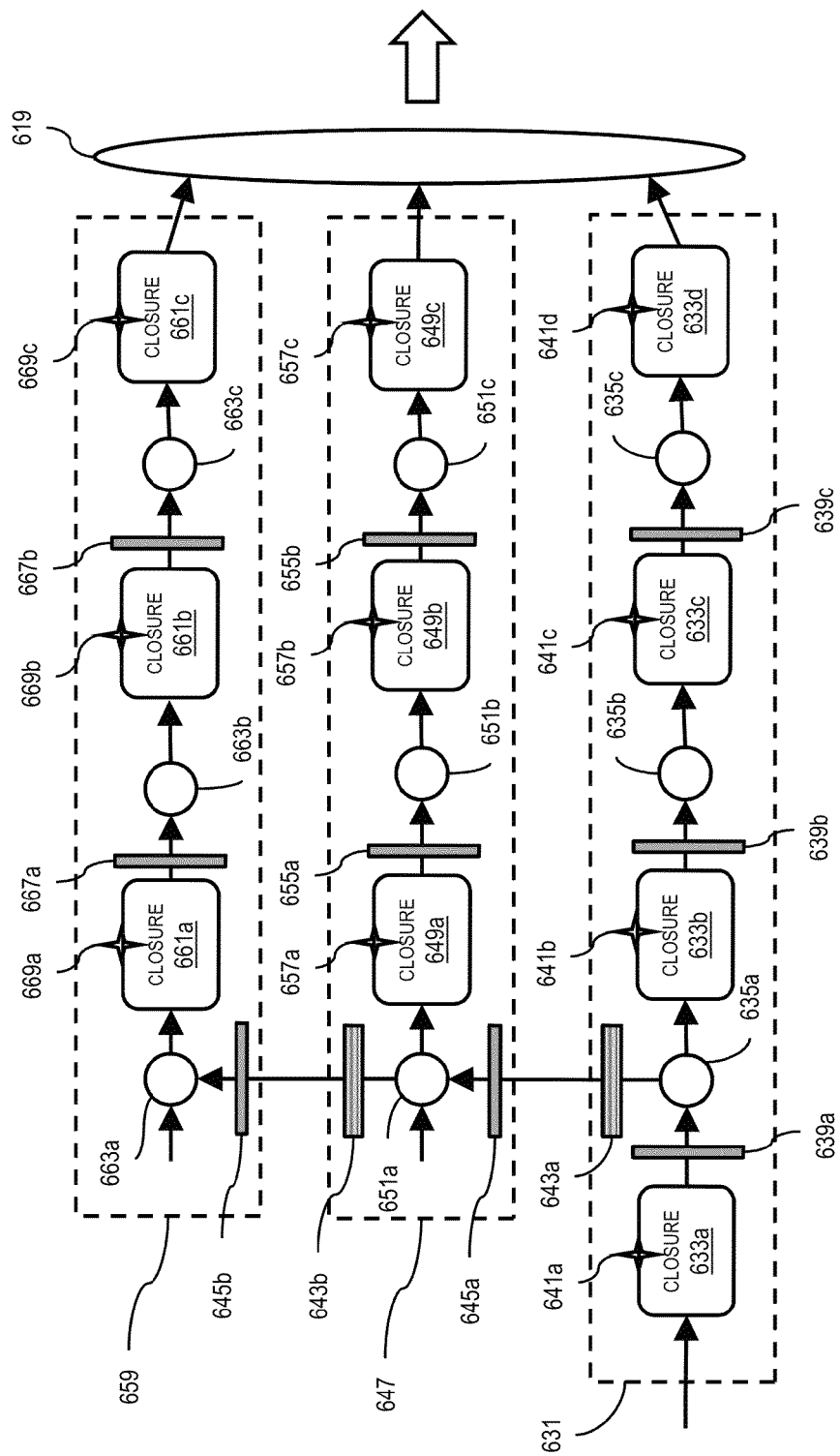

FIGS. 6A and 6B are diagrams describing a functional flow of computation closures as distributed across nodes, according to various embodiments. FIG. 6A is a general representation of computation distribution. As seen in FIG. 6A, the computation distribution starts at a component 601 of an architectural level. Each component may execute a set of closures that constitute a computation branch. For example, the branch 601 is composed of closures 603a-603d, wherein every two consecutive closures are connected via a connector and computational branches are communicating via connectors as well. For example, connectors 605a-605c connect closures 603a-603d. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities, functional flows, distribution maps, links between closures and architectural levels, etc. Arrows connecting closures to connectors and connectors to next closures show the functional flow adopted based on the parameters. As seen in FIG. 6A, the closures have been distributed from component 601 to component 607 via communication between connector 605a and connector 611a. The computation branch of component 607 includes closures 609a-609c communicating via connectors 611b and 611c, while branches 601 and 607 communicate via connectors 605a and 611a. Similarly, a third branch 613 has been formed of closures 615a-615c being executed at component 613 and connected by connectors 617b and 617c, while the branch communicates with other branches via connector 617a. The final results from closure execution of the three branches 601, 607, and 613 are aggregated (619) by the search nodes 117, by applications 109a-109i, or a combination thereof, and forwarded to the requesting device.

FIG. 6B shows a computation distribution together with various parameters affecting the distribution. As seen in FIG. 6B, the computation distribution starts at a component 631 of an architectural level. Each component may execute a set of closures that constitute a computation branch. For example, the branch 631 is composed of closures 641a-641d, wherein every two consecutive closures are connected via a connector and computational branches are communicating via connectors as well. For example, connectors 635a-635c connect closures 633a-633d. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities, functional flow specifications, distribution maps, links between closures and architectural levels, etc. Arrows connecting closures to connectors and connectors to next closures show the functional flow adopted based on the parameters. For example, star signs 641a-641d, 657a-657c, and 669a-669c may represent capability parameters associated with each closure 633a-633d, 649a-649c, and 661a-661c respectively. Additionally, blocks 639a-639c, 655a-655b, 667a-667b, and 643a-643b may represent cost values. For example, the cost value 639a may show the cost for binding closure 633b to closure 633a and directs closure 633b to branch 631, via connector 635a, as the next closure to be executed after closure 633a. The closures may be initially assigned with priority levels, so that less important closures can be omitted if necessary. Similarly, cost values 639b and 639c direct closures 633c and 633d in branch 631 via connectors 637b and 637c. In a higher level of hierarchy, the cost value 645a directs closures 649a-649c to component 647 and similarly the cost value 645b directs closures 661a-661c to component 659. Additionally in branch 647, connectors 651a-651c and cost values 655a and 655b direct closures 649a-649c down the path of branch 647. Similarly, in branch 659, connectors 663a-663c and cost values 667a and 667b direct closures 661a-661c down the path of branch 659. The final results from closure execution of the three branches 631, 647, and 659 are aggregated (shown by arrow 619) and forwarded to the requesting device.

The processes described herein for providing a standard data processing model through machine learning may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
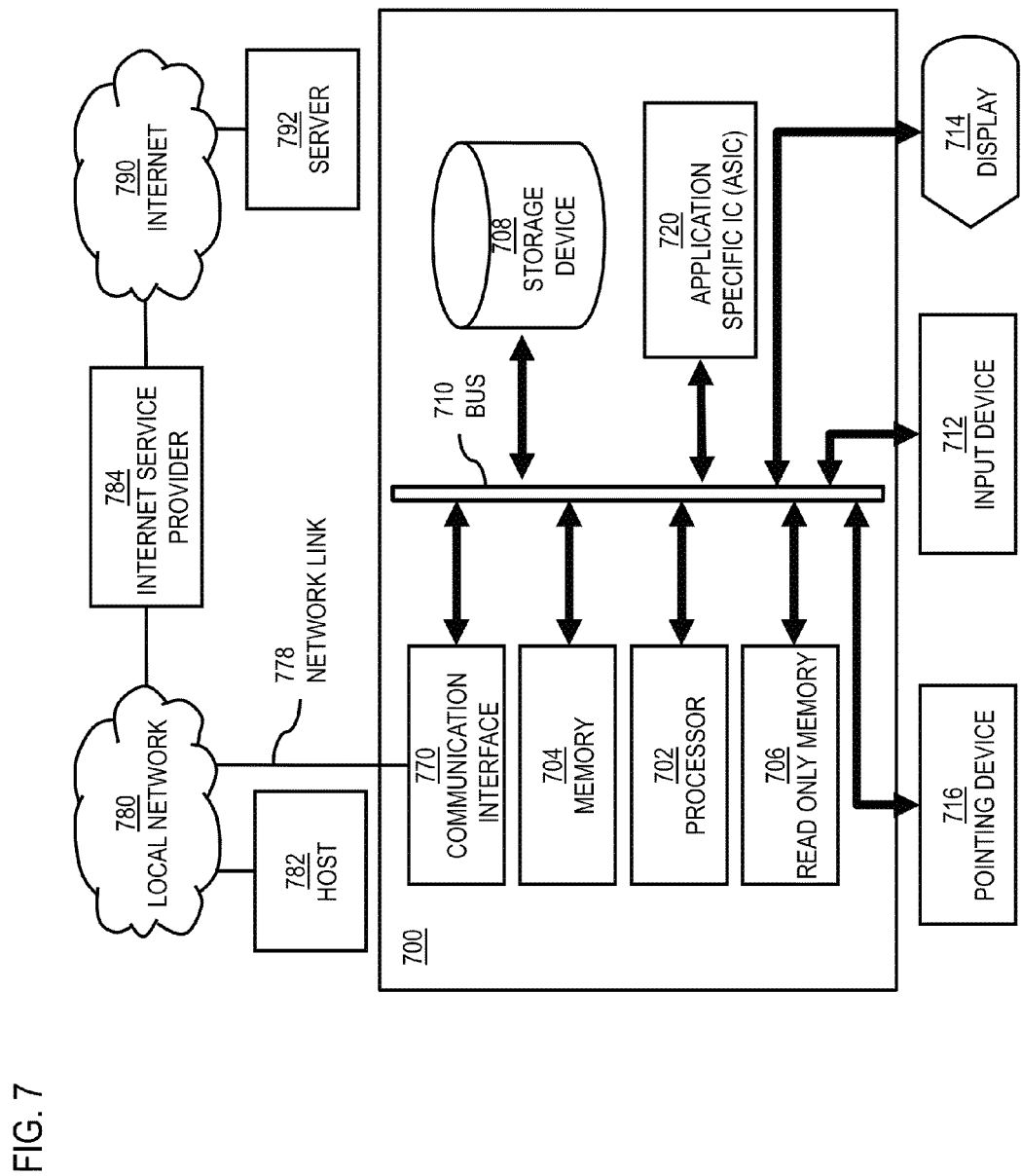
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to provide a standard data processing model through machine learning as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of providing a standard data processing model through machine learning.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to provide a standard data processing model through machine learning. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for providing a standard data processing model through machine learning. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for providing a standard data processing model through machine learning, is provided to the bus 710 for use by the processor from an external input device 712, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for providing a standard data processing model through machine learning to the applications 109 provided on the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to provide a standard data processing model through machine learning as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of providing a standard data processing model through machine learning.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to provide a standard data processing model through machine learning. The memory 805 also stores the data associated with or generated by the execution of the inventive steps.

Figure 9:
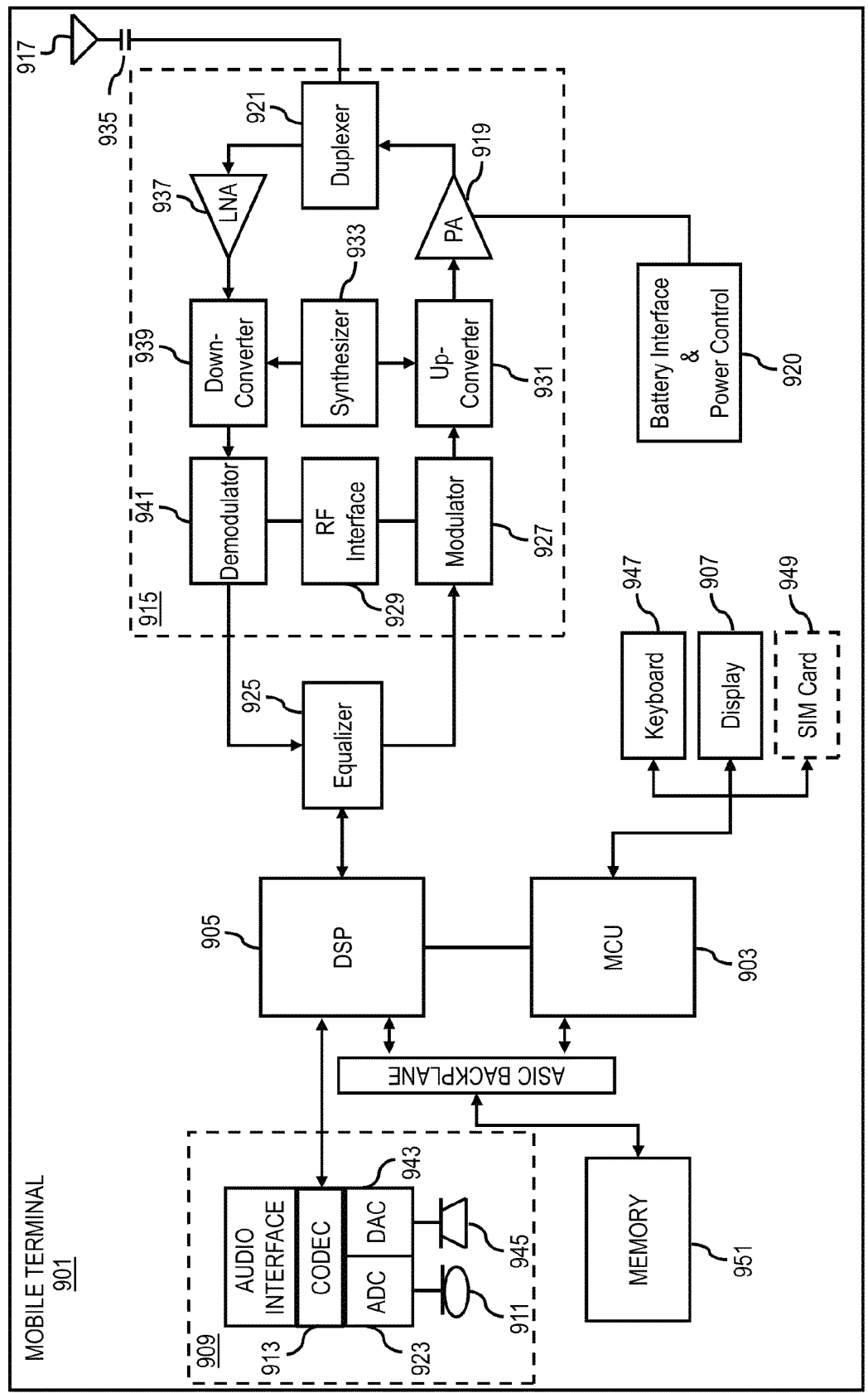
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of providing a standard data processing model through machine learning. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of providing a standard data processing model through machine learning. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to provide a standard data processing model through machine learning. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    a processing of the at least one data set associated with one or more computation closures to determine at least one data pattern;
    at least one determination of one or more data processing models associated with the one or more computation closures, the at least one data set, or a combination thereof, wherein the one or more computation closures comprise at least one functional flow;
    a training of the one or more data processing models to reflect the at least one data pattern; and
    a recycling of the one or more computation closures, one or more other computation closures, or a combination thereof to rebuild the at least one functional flow.

2. A method of claim 1, wherein the one or more data processing models are associated with one or more data extraction processes, one or more data transformation processes, one or more data loading processes, or a combination thereof.

3. A method of claim 1, wherein the (1) data and/or (2) information and/or (3) at least one signal are further based, at least in part, on the following: an execution of the one or more computation closures, the at least one functional flow, or a combination thereof to return one or more results, wherein the one or more results comprise, at least in part, the at least one data set.

4. A method of claim 1, wherein the (1) data and/or (2) information and/or (3) at least one signal are further based, at least in part, on the following: the recycling of the one or more computation closures, one or more other computation closures, or a combination thereof to rebuild the at least one functional flow is based, at least in part, on the training of the one or more data processing models.

5. A method of claim 1, wherein the (1) data and/or (2) information and/or (3) at least one signal are further based, at least in part, on the following: a serialization of the one or more computation closures, the at least one functional flow, or a combination thereof into one or more data objects.

6. A method of claim 1, wherein the (1) data and/or (2) information and/or (3) at least one signal are further based, at least in part, on the following: a distribution of the one or more data processing models, the training of the one or more data processing models, or a combination thereof among the one or more computation closures, the functional flow, or a combination thereof.

7. A method of claim 1, wherein the (1) data and/or (2) information and/or (3) at least one signal are further based, at least in part, on the following:
    a processing of the at least one data set to determine one or more classifiers; and
    at least on determination of the at least one data pattern based, at least in part, on the one or more classifiers.

8. A method of claim 1, wherein the (1) data and/or (2) information and/or (3) at least one signal are further based, at least in part, on the following:
    a processing of the at least one data set based, at least in part, on one or more semantic rules to determine the at least one data pattern.

9. A method of claim 1, wherein the one or more computation closures, the at least one data set, or a combination thereof are associated with at least one domain; and wherein the one or more data processing models, the training of the one or more data processing models, or a combination thereof is specific to the at least one domain.

10. An apparatus comprising:
at least one processor; and
at least one memory including computer program code for one or more programs,
the at least one memory and the computer program code configured to, with the at least one processor, cause the apparatus to perform at least the following,
processing and/or facilitating a processing of the at least one data set associated with one or more computation closures to determine at least one data pattern;
determining one or more data processing models associated with the one or more computation closures, the at least one data set, or a combination thereof, wherein the one or more computation closures comprise at least one functional flow;
causing, at least in part, a training of the one or more data processing models to reflect the at least one data pattern; and
causing, at least in part, a recycling of the one or more computation closures, one or more other computation closures, or a combination thereof to rebuild the at least one functional flow.

11. An apparatus of claim 10, wherein the one or more data processing models are associated with one or more data extraction processes, one or more data transformation processes, one or more data loading processes, or a combination thereof.

12. An apparatus of claim 10, wherein the apparatus is further caused to: causing, at least in part, an execution of the one or more computation closures, the at least one functional flow, or a combination thereof to return one or more results, wherein the one or more results comprise, at least in part, the at least one data set.

13. An apparatus of claim 10, wherein the apparatus is further caused to: the causing, at least in part, of the recycling of the one or more computation closures, one or more other computation closures, or a combination thereof to rebuild the at least one functional flow is based, at least in part, on the training of the one or more data processing models.

14. An apparatus of claim 10, wherein the apparatus is further caused to: causing, at least in part, a serialization of the one or more computation closures, the at least one functional flow, or a combination thereof into one or more data objects.

15. An apparatus of claim 10, wherein the apparatus is further caused to: causing, at least in part, a distribution of the one or more data processing models, the training of the one or more data processing models, or a combination thereof among the one or more computation closures, the functional flow, or a combination thereof.

16. An apparatus of claim 10, wherein the apparatus is further caused to:
processing and/or facilitating a processing of the at least one data set to determine one or more classifiers; and
determine the at least one data pattern based, at least in part, on the one or more classifiers.

17. An apparatus of claim 10, wherein the apparatus is further caused to:
processing and/or facilitating a processing of the at least one data set based, at least in part, on one or more semantic rules to determine the at least one data pattern.

18. An apparatus of claim 10, wherein the one or more computation closures, the at least one data set, or a combination thereof are associated with at least one domain; and wherein the one or more data processing models, the training of the one or more data processing models, or a combination thereof is specific to the at least one domain.

* * * * *